United States Patent
Heinonen et al.

[11] Patent Number: 5,990,882
[45] Date of Patent: Nov. 23, 1999

[54] INTERACTIVE HOME TERMINAL EMPLOYING COMMON CONSUMER-ELECTRONICS AS COMPONENTS IN A MANNER TO FACILITATE THE BI-DIRECTIONAL COMMUNICATION OF DATA

[75] Inventors: Pekka Heinonen; Harri Okkonen, both of Espoo; Jeremy E Santos, Pori; Juha H. Salo, Tampere, all of Finland

[73] Assignee: Nokia Mobile Phones Ltd., Espoo, Finland

[21] Appl. No.: 08/847,291

[22] Filed: Apr. 24, 1997

[30] Foreign Application Priority Data

Apr. 26, 1996 [FI] Finland .................................... 961800

[51] Int. Cl.⁶ .............................. H04N 7/14; H04H 1/00
[52] U.S. Cl. .............................. 345/327; 348/12; 348/13; 348/10; 455/5.1; 455/6.3
[58] Field of Search ............................. 345/326, 327; 348/6, 7, 10, 12, 13; 455/3.1, 3.2, 4.1, 4.2, 5.1, 6.1, 6.2, 6.3; 386/46, 83

[56] References Cited

U.S. PATENT DOCUMENTS

| | | | |
|---|---|---|---|
| 4,451,701 | 5/1984 | Bendig | 179/2 TV |
| 4,987,486 | 1/1991 | Johnson et al. | 358/86 |
| 5,077,607 | 12/1991 | Johnson et al. | 358/86 |
| 5,341,166 | 8/1994 | Garr et al. | 348/10 |
| 5,357,276 | 10/1994 | Banker et al. | 348/7 |
| 5,812,931 | 9/1998 | Yuen | 455/5.1 |

FOREIGN PATENT DOCUMENTS

| | | |
|---|---|---|
| WO 92/09955 | 6/1992 | WIPO . |
| WO 95/11563 | 4/1995 | WIPO . |

*Primary Examiner*—John W. Miller
*Attorney, Agent, or Firm*—Perman & Green, LLP

[57] ABSTRACT

A consumer's interactive home terminal equipment includes a television (1). video tape recorder (2) and a telephone apparatus (6) or bidirectional paging device. The video tape recorder serves as both a mass storage and an input channel for new basic information, the television is a display device, and the telephone apparatus, advantageously a digital mobile phone, is a bidirectional communications channel to the outside world. A video cassette (3), which contains in picture format certain input forms, is inserted in the video tape recorder and an input form is displayed (10) on the television screen (4) to the user. The user fills out the necessary input fields (11) and the picture is converted (12) into a telephone short message or data call to be sent forward (13, 14, 15). An acknowledgment or other answer (16) received via telephone is stored (17) on the video cassette in picture format.

6 Claims, 2 Drawing Sheets

INTERACTIVE HOME TERMINAL EMPLOYING COMMON CONSUMER-ELECTRONICS AS COMPONENTS IN A MANNER TO FACILITATE THE BI-DIRECTIONAL COMMUNICATION OF DATA

BACKGROUND OF THE INVENTION

The invention relates in general to bidirectional audiovisual terminals intended to be used by consumers and in particular to equipment the initial costs of which are low and the operation of which is based on combining known devices and utilising their characteristics in a new and inventional manner.

Electrical telecommunications terminals intended for consumers can be divided into unidirectional and bidirectional devices. The most common unidirectional terminals are radio and television receivers. The most widely known bidirectional terminal has been, until recently, the telephone, but fax machines and computers with modems have now caught up with it. It has been suggested that a future home terminal equipment will be capable of transferring high-quality sound and images and other data bidirectionally in the form and at a time freely chosen by the user. So far, however, it has only been proposed equipments designed for certain limited applications, sharing a fairly high purchase price and a limited number of services available through them.

Consumers often find it hard to understand why they should replace or supplement their existing and tried and proved terminals with a wholly new apparatus which, on top of it all, is also expensive. Considering the needs of conservative consumers it is better if they can be offered new services without considerable investments in unknown technology.

An object of this invention is to provide a method and equipment for offering to the consumers new services based on bidirectional communications without the consumers being required to acquire new devices to a considerable extent.

SUMMARY OF THE INVENTION

The objects of the invention are achieved by combining a TV receiver, video tape recorder and a terminal of a bidirectional communications system, advantageously a digital mobile phone. The TV shows the picture and text information to the user, the video tape recorder serves as a mass storage and as an input channel for new data, and the terminal of a bidirectional communications system relays information between the equipment and the outside world.

The equipment according to the invention comprising a television and a terminal of a bidirectional communications system and means for transferring information between said television and said terminal of a bidirectional communications system for providing communication to and from said television over the bidirectional communications system is characterised in that it further comprises external storage means connected to the television for providing an application for communicating over said bidirectional communications system.

The invention is also directed to a method which is characterised in that it comprises stages in which an input form is read from a storage means and displayed to the user on a television screeen, in response to data input by the user the image formed of said input form is read and converted into a data message, said data message is sent to a recipient in a telephone network, and in response to an answer message received through the telephone network the data in said answer message are stored on the storage means in picture format.

The invention is based on the perception that a great number of consumers already have in their possession the required display, memory and communications capacity, so what is only needed is to harness it to operate in a new manner. A TV picture tube is an excellent large display device suitable for displaying both text and picture information to the user. In connection with the TV many consumers use a video tape recorder which essentially constitutes a high-capacity analogue mass storage. Any other similar storage means may be used as well, such as digital video storage means using digital discs for storage. Preferably a mass storage means like a video tape recorder is used, in which different applications may be applied by releasable memories, such as video tape. Different video tapes (different memory means) may thereby provide the user with data for using different applications. The mass storage means can also be used as an input channel by acquiring a video cassette (or another suitable releasable memory means) that contains the necessary data and inserting the cassette in the video tape recorder. When a telephone apparatus or other transceiver capable of transmitting and receiving information via a public telecommunications network is connected with this equipment, a multifunction home terminal equipment according to the present invention is produced.

DESCRIPTION OF THE DRAWINGS

The invention is described in more detail with reference to the preferred embodiments presented by way of example and to the attached drawing in which.

DETAILED DESCRIPTION OF THE INVENTION

Figure 1:
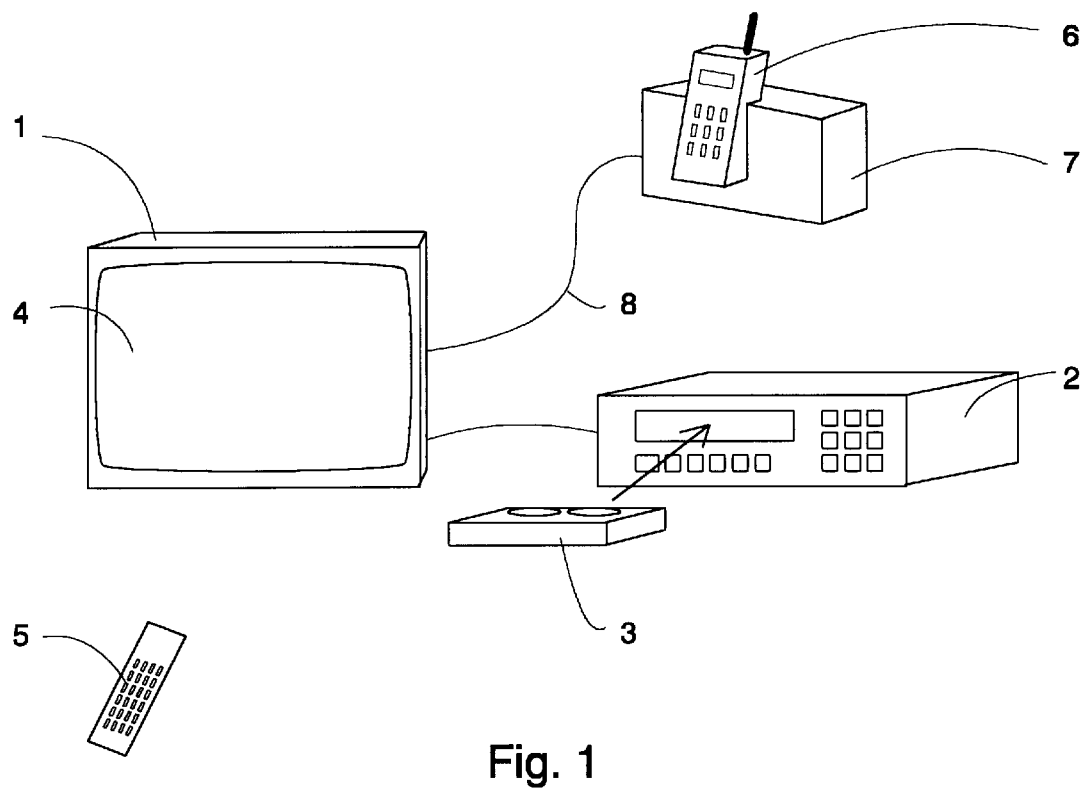
FIG. 1 shows in diagrammatic manner a home terminal equipment according to the invention.

FIG. 1 shows a TV receiver 1 and a video tape recorder 2 connected to the TV in a known manner for reading picture information from video cassettes 3 and displaying it on a television screen 4. The concept of picture information is to be understood as broadly as possible in this context because e.g. text on the TV screen is considered picture information by the TV and video tape recorder. The equipment usually includes a remote control device 5 which makes the use of the equipment easier but is not necessary as far as the present invention is concerned.

FIG. 1 also shows a mobile phone 6 which represents the terminal of a bidirectional communications system. Instead of a mobile phone the equipment may comprise an ordinary phone, cordless phone, bidirectional paging device, fax machine or a corresponding apparatus; what is essential is that by means of the apparatus the equipment can send and receive information via a public telecommunications system. As far as the invention is concerned, it is preferable to use a digital mobile phone since digital communications provide more versatile features than analogue communications e.g. as regards encryption of information and use of error correction codes. Additionally, as the mobile phone is independent of wired connections it does not limit the use of the terminal according to the invention so as to be located near a telephone wall socket.

The mobile phone 6 is connected to the terminal equipment constituting a TV and video tape recorder through an interface part 7 and local communications link 8. In the embodiment depicted in FIG. 1 the communications link 8 comprises a wired connection coupled to the antenna connector, SCART connector, Euroconnector, Peritele connector or other corresponding video connector (not shown in the drawing) in the TV or video tape recorder. It could also be an infrared link or other known communications link suitable for local use. In the embodiment of FIG. 1 the interface part 7 is a so-called application-specific charger accessory the more detailed structure of which is not depicted in the drawing but which comprises, among other things, protocol converters used for making the conversions between the data format of the mobile phone and that of the TV-video tape recorder combination. In addition, the charger accessory 7 has got teletext capability and a picture dropper memory which can be used for the temporary storage of TV images at full resolution. The charger accessory 7 can store in the picture dropper memory an image on the TV screen 4 or an image read from a video cassette 3. It can also read an image from the picture dropper memory and display it on the TV screen 4 or store it via a video tape recorder 2 on a video cassette 3.

Figure 3:
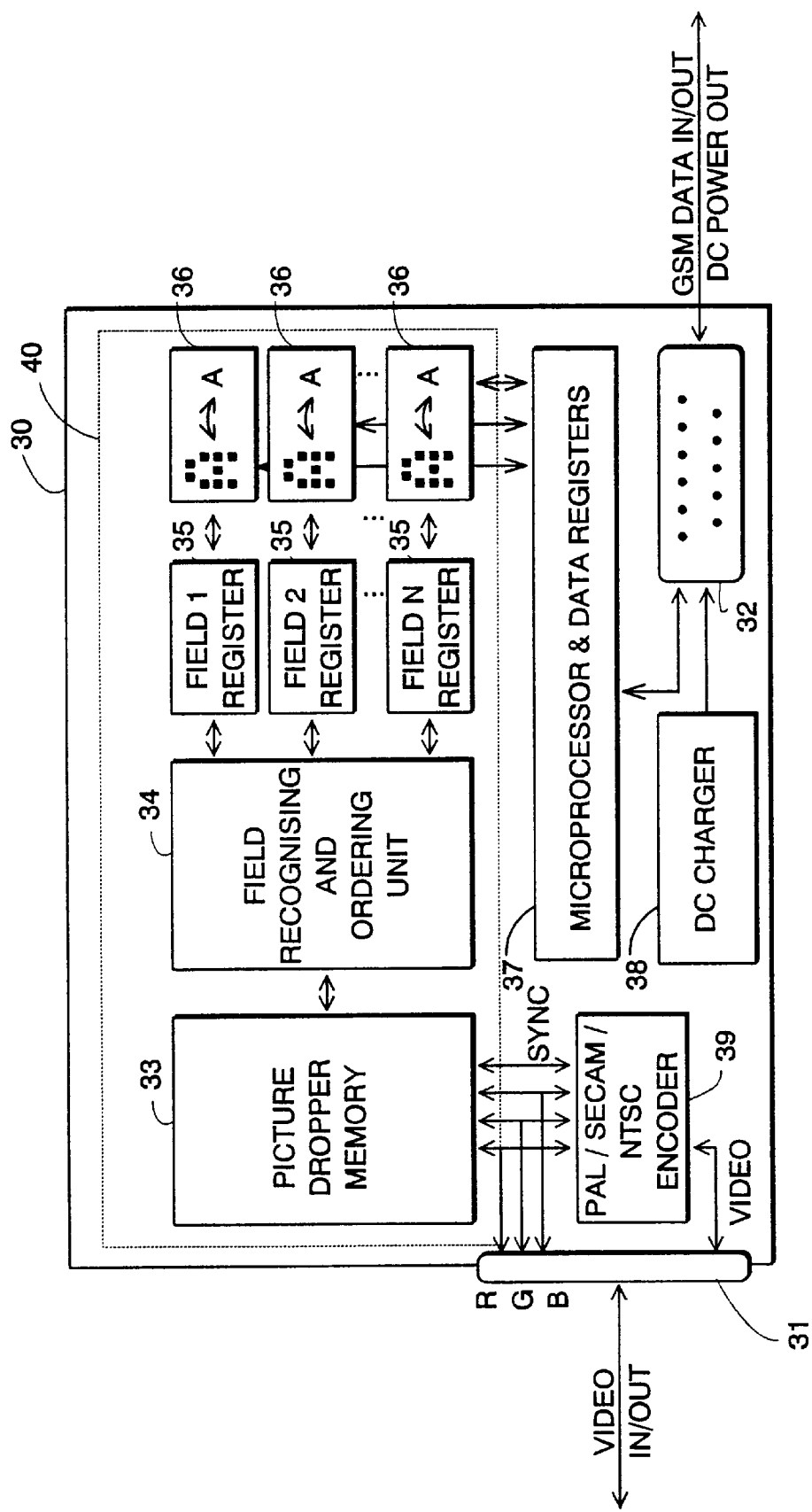
FIG. 3 shows in diagrammatic manner the operation of a component of a home terminal equipment according to the invention.

FIG. 3 illustrates in block diagram format the structure and operation of an application-specific charger accessory. The charger accessory 30 (reference 7 in FIG. 1) has an antenna connector, SCART connector, Euroconnector, Peritele connector or other corresponding video connector 31 for connecting it in the manner described above to a TV set or video tape recorder or corresponding storage means as was described above. The charger accessory 30 also has a special, usually telephone manufacturer specific, connector 32 for connecting it to a mobile phone. In addition, the charger accessory has a PAL/SECAM/NTSC encoder 39 and a graphics chip 40 which includes a picture dropper memory 33 for the temporary storage of TV images, a field recognising and ordering unit 34, a certain number of field registers 35 and a corresponding number of video-data converters 36. The structure of the graphics chip shown in FIG. 3 is presented by way of example only; this component may also be a ready-made component such as a Siemens Megatext type chip, for example. The charger accessory further comprises a microprocessor (e.g, a 80C52 type microprocessor) as well as the data registers 37 required by it and a power supply 38. The field recognition and ordering unit 34 can extract from an image stored in the picture dropper memory 33 certain areas that are called fields and arrange them in a predetermined order such that the fields can be numbered from 1 to N where N is the maximum allowable number of fields. The field registers 35 are smallish memory units each of which holds a field, or a certain two-dimensional set of pixels, which is part of a TV image stored in the picture dropper memory 33. Instead of pixels the image may also be handled in bigger units, or blocks, so that each block may comprise, for example, 8×8 pixels. This makes the resolution of the picture poorer but at the same time reduces the need for memory capacity.

Each field register is connected with a video-data converter 36, which is a kind of a bidirectional pattern recognition device, meaning that the video-data converter is able to convert a two-dimensional pixel or block set into a bit sequence and vice versa. The video-data converter recognises in the field the pixel sets that represent certain alphanumeric characters, for example, and converts them into ASCII codes representing the alphanumeric characters in question. Such a converter is known from various display devices, pattern recognition devices and other kinds of graphics chips. The video-data converters 36 communicate bidirectionally with the microprocessor and data register 37 so that a certain bit sequence can be compiled in a certain data register from the results yielded by the converters or, correspondingly, the bit sequence in a certain data register can be directed in parts to the converters in order to create the corresponding pixel or block sets. The microprocessor can direct the necessary data via the connector 32 to the mobile phone connected with it. For the accessory 30 to be able to serve as a charger for the mobile phone's battery, the power supply 38 included in it has also got a feed voltage connection to the connector 32. The accessory 30 may include only a power supply input, whereby the accessory may be like a desktop stand for receiving a mobile phone at connector 32 and power from an external charger via power supply input 38. The connector 32 may include a data adapter or a data adapter may be connected between connector 32 and the mobile phone for adapting data for sending it over a mobile phone system, such as the GSM system, and also for adapting data received over the mobile phone system to a format suitable for graphics chip 40. Such data adapter is known e.g., as data cards for connecting a computer to a mobile phone.

If the user intends to control the operation of the equipment using an infrared remote controller, the application-specific charger accessory according to FIG. 3 can be equipped with an infrared receiver with a connection to the microprocessor 37. Then the user is able to give commands direct to the charger accessory and via it to the mobile phone or other components of the equipment.

Figure 2:
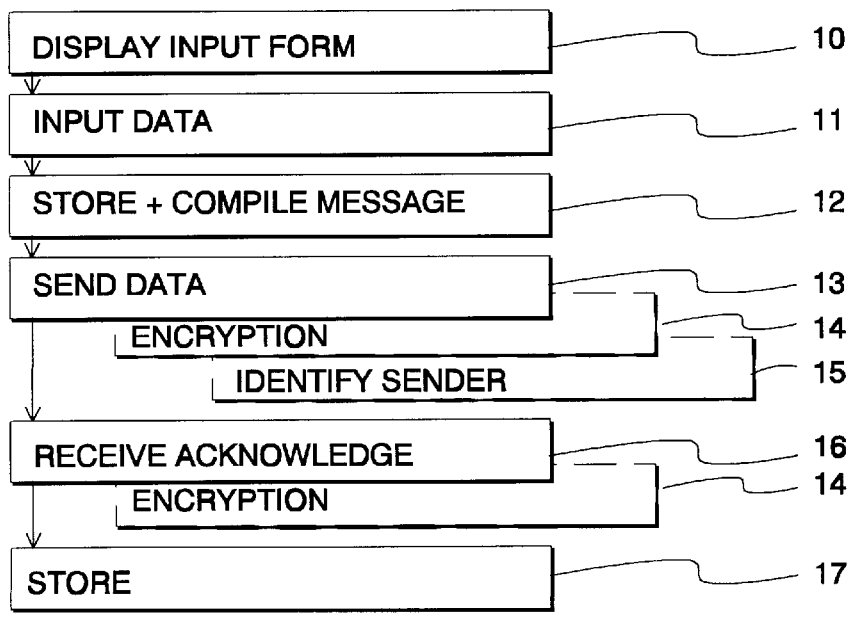
FIG. 2 shows stages of the method according to a preferred embodiment of the invention.

Below, the method according to the invention is described with reference to the devices shown in FIG. 1 and the stages shown in FIG. 2. Let us assume that the user wants to use his terminal equipment as a banking terminal in which case one important function is to make a payment, or transfer money from a bank account to another. The user has earlier obtained from his bank a video cassette 3 which contains various blank forms in picture format. In response to a command issued by means of a remote control device 5, which command may be based on control menus displayed by a TV set 1, a video tape recorder 2 reads from the video cassette a blank payment form displayed for the user on the TV screen 4. The blank payment form can be called generally an input form and its presentation to the user is the first stage 10 of the method in FIG. 2.

The user enters the payment data by giving them as push-button commands on the remote control device 5. Here, again, menus displayed by the TV can be applied. The data, such as the bank account number of the payee, the amount payable and the reference number, are displaced in the respective fields of the payment form shown on the screen 4. This stage is called generally the entering of data and it is denoted by reference designator 11 in FIG. 2. When all the data have been entered the user gives a certain end command whereafter the completed payment form shown on the screen 4 is read into the picture dropper memory in the charger accessory 7. The charger accessory extracts the user input from the picture and converts it e.g, to a short message, which refers to a transmission format of relatively short character string type messages used in digital cellular radio systems. Instead of a short message the data can be transmitted as a data call. Storage of the image in the picture dropper memory and the consequent compilation of the message are depicted as one stage 12 in FIG. 2.

Regardless of the transmission format the payment data are transferred to the bank via a mobile phone 6 and public telecommunications network. In the case of banking services or other confidential messages it is usually necessary to use encryption and sender identity verification which are known procedures in the GSM system, for example, and based on the information stored in the SIM card (Subscriber Identity Module) of the mobile phone's owner. Sending of data and the possible encryption and sender identity verification are denoted by reference designators 13, 14 and 15 in FIG. 2. When the receiver ie, the bank's computer (not shown in the drawing), has processed the transaction it sends to the user an acknowledgment through the mobile phone 6. Lest a dishonest user be able to receipt his bills himself, it is necessary, to apply an encryption method to the acknowledgment as well. The acknowledgment is stored in the picture dropper memory of the charger accessory 7 advantageously in a field of that same picture which represented the transaction in the sending stage. The picture to which the acknowledgment is added can be displayed to the user on the TV screen 4 and is also stored on a video cassette 3 and protected against later editing and overwriting. If the system includes a printer, a hardcopy can be printed out of the receipted payment. The receipting and storing are denoted by reference designators 16 and 17 in FIG. 2.

Providers of various services can easily apply the system according to the invention in accordance with their needs by preparing a video cassette which includes the required input forms and which is distributed to users. The input forms can also be transmitted as ordinary TV transmissions or even via the telephone system so that the user is able to record them on video tape for later use. The input forms distributed on video cassettes can also be personalised. For example, all input forms of a user can include the name of the user so that the user need not add it himself. Furthermore, a user with a poor eyesight can have his input forms with enlarged texts. Since the equipment formed of a video tape recorder and TV is also suitable for the playback of sound messages to the user, sound messages can be associated with certain input forms.

It is obvious to one skilled in the art that the banking service function described above is presented by way of example only and the invention can be used for offering many different services. If a service provider who wants to get a remuneration for the use of a service cannot debit the user's bank account direct, the service can be invoiced by adding the charge to the user's telephone bill.

Other examples of services the implementation of which can be derived from the banking service described above include the displaying of public transportation timetables and reservation of tickets, gallup polls mail-order selling of various products lotto, pools and betting services and, in connection with stock exchange activities, displaying of real-time information on stock exchange rates and making buy and sell orders. These different applications may be introduced into the equipment by purchasing a releasable memory, such as a video tape or a video disc, containing a specific application or data for a specific application (e.g, different forms for performing different kinds of banking operations). The input forms of the most frequently used services can also be stored in a semiconductor memory in the TV, video tape recorder or charger accessory so that they be quickly accessible and the user need not load them from the video cassette. Also the picture dropper memory described above may be included in the TV or video tape recorder instead of the charger accessory. The main reason for locating it in the charger accessory is the attempt to keep down the number of components added to the TV and video tape recorder to provide the home terminal equipment according to the invention.

The invention is an obvious improvement from the prior art as it brings certain electrical services requiring bidirectional communications in a new manner available to a very large group of consumers. Consumers can use TVs and video tape recorders already in their homes by acquiring an interface unit by means of which a mobile phone or other terminal of a bidirectional communications system is connected to the home terminal equipment according to the invention.

We claim:

1. In a home terminal system for providing application services to a user, said system including, a television (1), a terminal (6) of a bi-directional communications system, means (7,8) for transferring information between said television and said terminal, and means for providing communication to and from said television over the bi-directional communications system, said system also including storage means (2) communicating with said television, said storage means adapted to receive releasable memories (3), a method comprising the steps of:

storing an application on a releasable memory;

engaging the releasable memory in the storage means;

transmitting data relating to said application to said television;

displaying a certain input form for said application on said television;

entering user specific data in the input form;

reading said input form as an image converting said user specific data image into a data message;

transmitting said data message via the bi-directional communications system;

receiving a data message response via the bi-directional communications system; and storing said responsive data message as an image in the storage means.

2. The method of claim 1, characterised in that the format of said data message is a short message specified in a digital mobile network.

3. The method of claim 1, characterised in that the format of said data message is a data call.

4. Home terminal equipment comprising a television (1) and a terminal (6) of a bi-directional communications system and means(7,8) for transferring information between said television and said terminal of a bi-directional communications system for providing communication to and from a specialty service provider over the bi-directional communications system, wherein the home terminal equipment further comprises:

external storage means (2) connected to the television for providing an application for communicating over said bi-directional communications system, said storage means (2) adapted to receive releasable memories (3) from said specialty service provider for allowing a user of the home terminal equipment to provide the equipment with an application stored in said releasable memories (3), said application including a data input form for display on said television;

control means for selecting a specialty service application and for entering data in the context of the input form; and a video-data converter (36) adapted to convert said completed input form to a data message for communication over said bi-directional communications system.

5. The home terminal equipment of claim 4, characterised in that said terminal of a bidirectional communications system is a bidirectional paging device.

6. The home terminal equipment of claim 4, wherein the external storage means (2) is a video tape recorder and the releasable memories (3) are video tapes.

* * * * *